US005671514A

United States Patent [19]
Matoba et al.

[11] Patent Number: 5,671,514
[45] Date of Patent: Sep. 30, 1997

[54] SWIVEL HOOK

[75] Inventors: Hiroshi Matoba; Hirokazu Watanabe, both of Toyama-ken, Japan

[73] Assignee: YKK Corporation, Japan

[21] Appl. No.: 683,211

[22] Filed: Jul. 18, 1996

[30] Foreign Application Priority Data

Jul. 20, 1995 [JP] Japan .................... 7-184324

[51] Int. Cl.$^6$ .................................... A44B 13/00
[52] U.S. Cl. .................. 24/601.2; 24/600.9; 24/601.1
[58] Field of Search ................. 24/601.2, 601.1, 24/601.4, 600.8, 600.9, 599.1, 599.5, 599.9

[56] References Cited

U.S. PATENT DOCUMENTS

| | | | |
|---|---|---|---|
| 750,373 | 1/1904 | Kinnear | 24/601.1 |
| 1,005,257 | 10/1911 | Mast | 24/600.9 |
| 1,504,416 | 8/1924 | Baude | 24/600.9 |
| 1,737,549 | 12/1929 | Ballou, Jr. et al. | 24/601.4 |
| 4,464,813 | 8/1984 | Bakker et al. | 24/601.1 |
| 4,665,592 | 5/1987 | Kasai | 24/601.2 |

FOREIGN PATENT DOCUMENTS 1412809  11/1975  United Kingdom ............ 24/601.1

*Primary Examiner*—Victor N. Sakran
*Attorney, Agent, or Firm*—Hill, Steadman & Simpson

[57] ABSTRACT

A swivel hook including a head portion pivotally connected to the strap connector body, a hook-shape leg projecting from the head portion, and an unhooking-preventing leg projecting from the head portion toward a tip of the hook-shaped leg and resiliently deformable about its own base end. The hook-shaped leg has on its inner surface near its base end a projection engageable with an inner surface of the unhooking-preventing leg within an elastic-limit range of the unhooking-preventing leg when the unhooking-preventing leg is deformed.

4 Claims, 2 Drawing Sheets

SWIVEL HOOK

BACKGROUND OF THE INVENTION

1. Field of the Invention

This invention relates to a swivel hook for a bag, a rucksack, etc.

2. Description of the Related Art

Generally, swivel hooks of the type described above are made of metal or synthetic resin. Especially a metallic swivel hook is composed of a relatively large number of components and hence the number of assembling steps increases, which not only would increase the cost of production but also would be difficult to make durable coloring, thus resulting in unfashionable products. For this reason, the metallic swivel hooks are not suitable for use in traveler's bags, shoulder bags, etc. On the other hand, a synthetic resin swivel hook is composed of a relatively small number of components and hence is excellent in productivity, which would reduce not only the cost of production but also the weight of products. Therefore use of the synthetic resin swivel hooks are on the increase.

The typical structure of such synthetic resin swivel hook is disclosed in, for example, Japanese Patent Laid-Open Publication No. Hei 5-215117, in which the swivel hook comprises a ring member to which one end of a strap, a belt, etc. is to be connected, and a hook body having a neck portion pivotally connected to the ring member, a hook-shaped leg projecting from the neck portion and an unhooking-preventing leg projecting from the neck portion so as to normally close the opening of the hook-shaped leg and resiliently deformable. The hook body and the ring member are molded independently of each other, whereupon a shrinkable-in-diameter enlarged pivot portion of the hook body is fitted in an opening of the ring member in a snap action to complete the swivel hook.

However, as disclosed in Japanese Patent Laid-Open Publication No. Hei 5-215117, the unhooking-preventing leg is generally in the form of a thin plate as compared to the hook-shaped leg. The base end of the unhooking-preventing leg, together with the base end of the hook-shaped leg, is integrally molded with the rear surface of the neck portion, while its tip is resiliently in touch with the tip of the hook-shaped leg. When the hook-shaped leg is to be connected to a ring attached to a bag, etc., the unhooking-preventing leg is resiliently bent about its base end so that the ring enter through an opening of the hook-shaped leg, whereupon the unhooking-preventing leg resiliently restores to close the opening of the hook-shaped leg, thus preventing the ring from being removed off the hook-shaped leg. When the ring is to be removed from the hook-shaped leg, the unhooking-preventing leg is positively resiliently bent inwardly of the hook-shaped leg to open the hook-shaped leg.

Thus when the hook-shaped leg is to be connected to or removed from the ring, the unhooking-preventing leg is formed to a large extent. If the ring merely enters the hook-shaped portion, the interior space of the hook-shaped leg could have been set a minimum size enough for the ring to pass, but the swivel hook is generally required, in addition to serving as a connector between a bag and a strap, to give a freedom of relative movement between the bag and the strap. Consequently an adequately large size is necessary for the interior space of the hook-shaped leg as compared to the diameter of the ring, and as a result, the unhooking-preventing leg would tend to be deformed to an extent larger than necessary.

During this deformation, the unhooking-preventing leg is hardly broken when a relatively large external force acts on its tip but the unhooking-preventing leg can be unexpectedly easily broken at its base end when a relatively large external force acts on the unhooking-preventing leg near its base end. This problem would occur not only in the synthetic resin swivel hook but also in the metallic swivel hook, irrespective of whether the external force is given from the outer side or inner side.

SUMMARY OF THE INVENTION

It is an object of this invention to provide a swivel hook in which an unhooking-preventing leg is free from any damage even when a relatively large external force acts on the unhooking-preventing leg near its base end.

According to a first aspect of the invention, the above object is accomplished by a swivel hook including a head portion, a hook-shaped leg projecting from the head portion, and an unhooking-preventing leg projecting from the head portion toward a tip of the hook-shaped leg and resiliently deformable about a base end thereof, the swivel hook further including a restriction means, which is provided between the hook-shaped leg and the unhooking-preventing leg, for restricting movement of the unhooking-preventing leg within an elastic-limit range of the base end of the unhooking-preventing leg when the unhooking-preventing leg is deformed.

According to a second aspect of this invention, the above object is accomplished by a swivel hook including a head portion, a hook-shaped leg projecting from the head portion, and an unhooking-preventing leg projecting from the head portion toward a tip of the hook-shaped leg and resiliently deformable about a base end thereof, the swivel hook further including a projection which projects from an inner surface of the hook-shaped leg near a base end thereof toward the unhooking-preventing leg, and a tip of the projection is engageable with an inner surface of the unhooking-preventing leg within an elastic-limit range of the unhooking-preventing leg when the unhooking-preventing leg is deformed.

According to a third aspect of the invention, the above object is accomplished by a swivel hook including a head portion, a hook-shaped leg projecting from the head portion, and an unhooking-preventing leg projecting from the head portion toward a tip of the hook-shaped leg and resiliently deformable about a base end thereof, the swivel hook further including a projection which projects from an inner surface of the unhooking-preventing leg near a base end thereof toward the hook-shaped leg, and a tip of the projection is engageable with an inner surface of the hook-shaped leg while the unhooking-preventing leg is within an elastic-limit range when the unhooking-preventing leg is deformed.

According to a fourth aspect of the invention, the above object is accomplished by a swivel hook including a head portion, a hook-shaped leg projecting from the head portion, and an unhooking-preventing leg projecting from the head portion toward a tip of the hook-shaped leg and resiliently deformable about a base end thereof, the swivel hook further including a first and a second projections which project from respective inner surfaces of the hook-shaped leg and the unhooking-preventing leg near respective base ends thereof toward each other, and a total height of the projections is set to be such that the unhooking-preventing leg contacts an inner surface of the hook-shaped leg while the unhooking-preventing leg is within an elastic-limit range when the unhooking-preventing leg is deformed.

DETAILED DESCRIPTION OF THE PREFERRED EMBODIMENTS

Preferred embodiments of this invention will now be described in detail with reference to the accompanying drawings. In the following illustrated examples, a strap connector body and a hook body are molded independently of each other and then they are assembled together. Alternatively, they may be simultaneously molded as an assembled form.

Figure 1:
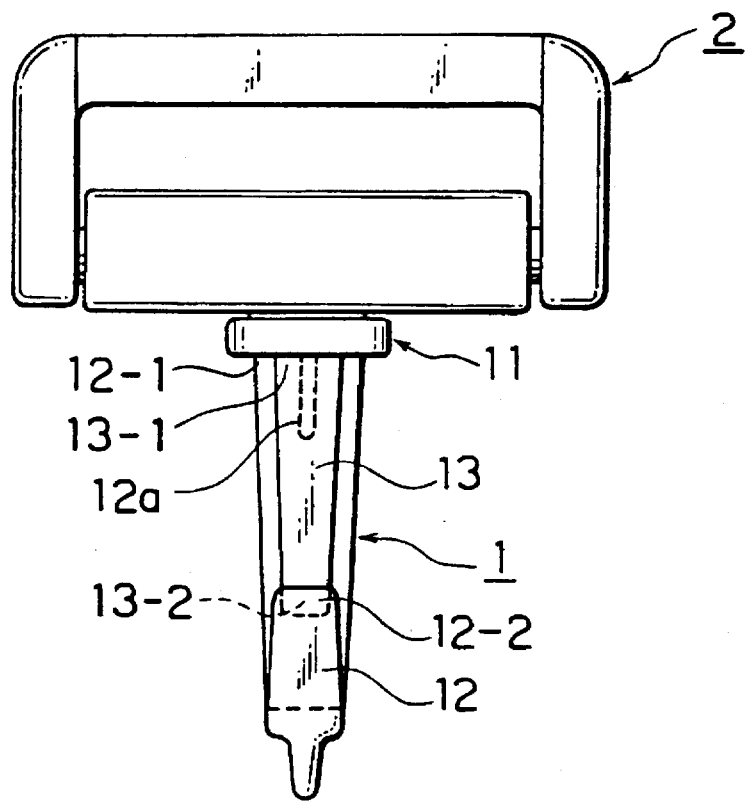
FIG. 1 is a front view of a swivel hook according to a first embodiment of this invention.
Figure 2:
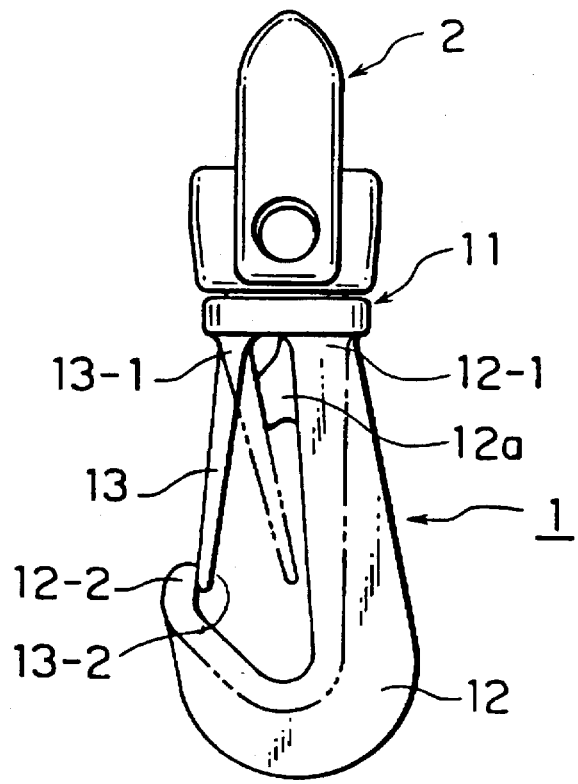
FIG. 2 is a side view of the swivel hook of the first embodiment.

In FIGS. 1 and 2, reference numeral 1 designates a hook body molded of thermoplastic synthetic resin and comprising a head portion 11 pivotally connected to a strap connector body 2, a hook-shaped leg 12 projecting downwardly from the head portion 11, and an unhooking-preventing leg 13 projecting diagonally downwardly from the head portion 11 and terminating in a tip resiliently touching a tip of the hook-shaped leg 12 from the inner side so as to normally close an opening of the hook-shaped leg 12 when the unhooking-preventing leg 13 is in a free form. These components are substantially identical in structure with those of the hook body disclosed in Japanese Patent Laid-Open Publication No. Hei 5-215117, and their detailed description is omitted here.

For a characteristic feature of the first embodiment, as shown in FIG. 2, the hook-shaped leg 12 has a generally trapezoidal rib-like projection 12a, which is a restriction means of the invention, integrally extending from an inner surface of its base end 12-1. The shape of this projection should by no mesas limited to the illustrated example and various alternative shapes may be suggested. The rib-like projection is, like this embodiment, advantageous as it is possible to secure an adequate degree of toughness regardless of the reduced amount of resin used.

The rib-like projection 12a has a height such that, when the unhooking-preventing leg 13 is resiliently deformed about its base end 13-1 due to a large external force acting on the unhooking-preventing leg 13 near the base end 13-1, the inner surface of the base end 13-1 of the unhooking-preventing leg 13 is brought into contact with a tip of the rib-like projection 12a without being broken, i.e. within an elastic-limit range of the base end 13-1 of the unhooking-preventing leg 13, and at a position where a necessary resilient deformation can be ensured.

Figure 3:
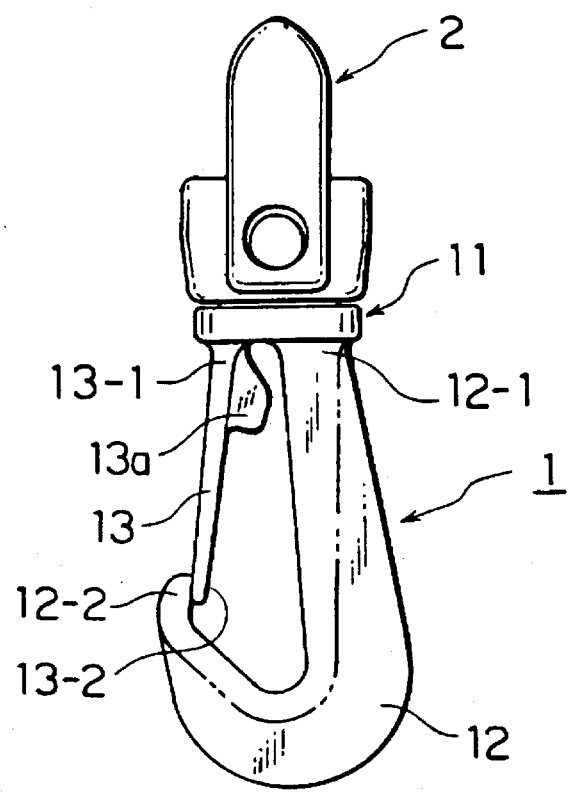
FIG. 3 is a side view of a swivel hook according to a second embodiment of the invention.

FIG. 3 shows a typical structure of a modified hook body 1' according to a second embodiment of the invention. As is understood from this drawing, in this embodiment, unlike the first embodiment, the unhooking-preventing leg 13 has a rib-like projection 13a, which is the restriction means of the invention, extending from the inner surface of its base end 13-1. Likewise the first embodiment, the rib-like projection 13a of this embodiment has a height such that, when the unhooking-preventing leg 13 is resiliently deformed about its base end 13-1, a tip of the rib-like projection 13a is brought into contact with the inner surface of the hook-shaped leg 12 within the elastic-limit range of the base end 13-1 of the unhooking-preventing leg 13 and is provided at a position where a necessary resilient deformation can be ensured. In this embodiment, the hook-shaped leg 12 is devoid of any rib-like projection.

Figure 4:
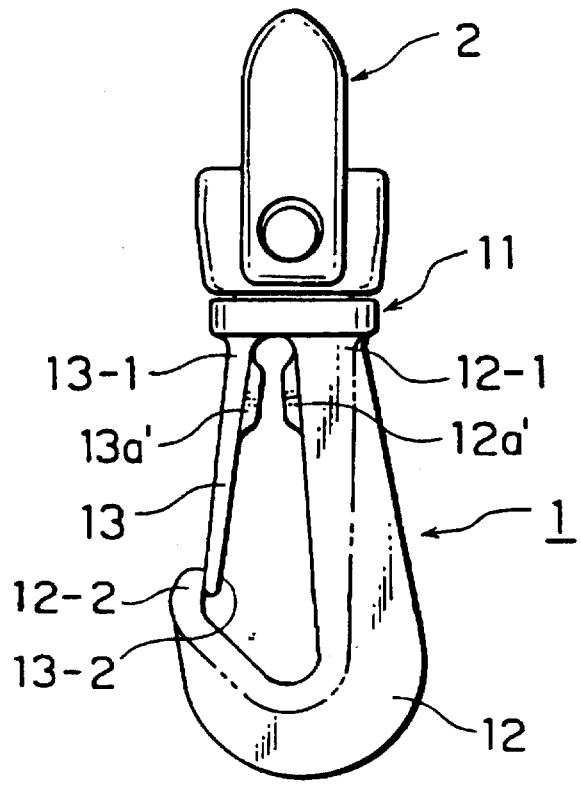
FIG. 4 is a side view of a swivel hook according to a third embodiment of the invention.

FIG. 4 shows a third embodiment which is equivalent to a combination of the first and second embodiments. In this embodiment, the hook-shaped leg 12 and the unhooking-preventing leg 13 have on the confronting inner surfaces of their respective base ends 12-1, 13-1, a first rib-like projection 12a' and a second rib-like projection 13a', respectively, which serve as the restriction means of the invention. The first and second rib-like projections 12a', 13a' have a total height such that the unhooking-preventing leg 13 is resiliently deformed about its base end 13-1 within the elastic-limit range of the unhooking-preventing leg 13 and also are provided at positions where a necessary resilient deformation can be ensured.

Alternatively, instead of the rib-like projections 12a, 13a, 12a', 13a', the base end 12-1 of the hook-shaped leg 12 and the unhooking-preventing leg 13 may be directly connected by a non-illustrated bridge. However, with such an arrangement, it is as if the base end 13-1 of the unhooking-preventing leg 13 moves to a lower end of the bridge and thus no advantageous results can be expected.

In the foregoing embodiments, the swivel hook is made of synthetic resin. Alternatively, the individual components of the swivel hook may be integrally molded by a die-casting; accordingly it may be molded of metal. As long as there is provided the above-described projection, various modifications may be suggested to the entire construction, shape, structure, etc. of the swivel hook. The shape of the projection also should not be limited to a rib.

As described above, according to the first through third embodiment of this invention, since the hook-shaped leg 12 and/or the unhooking-preventing leg 13 have on the confronting inner surfaces of their base ends 12-1, 13-1 a projection or projections 12a, 13a, 12a', 13a' having a necessary height, it is possible to prevent the unhooking-preventing leg 13 from being deformed beyond its elastic-limit so that it can be reliably prevented from being broken at its base end which is most likely easy to get broken.

Further, since the rib-like projection 12a, 13a, 12a', 13a' serves to prevent a ring hooked by the hook-shaped leg 12 from being moved to the space between the base ends 12-1, 13-1 of the hook-shaped leg 12 and the unhooking-preventing leg, the ring will be located toward the tip of the unhooking-preventing leg 13 even when an external force is exerted on the hook-shaped leg 12 outwardly by the ring, thus preventing the unhooking-preventing leg 13 from being broken at its base end 13-1.

The restriction means should by no means be limited to be positioned as described in the above embodiments, but it may be provided in any position as long as it can perform the above-described functions.

What is claimed is:

1. A swivel hook including:

a head portion having a planar surface;

a hook-shaped leg projecting at a base end thereof from said planar surface of said head portion; and an unhooking-preventing leg projecting at a base end thereof from said planar surface of said head portion toward a tip of said hook-shaped leg and resiliently deformable about said base end thereof, wherein a restriction means is provided between said hook-shaped leg and said unhooking-preventing leg, located at the base end of said legs, for restricting movement of said unhooking-preventing leg within an elastic-limit range of said base end of said unhooking-preventing leg when said unhooking-preventing leg is deformed.

2. A swivel hook including:

a head portion having a planar surface;

a hook-shaped leg projecting from said planar surface of said head portion; and an unhooking-preventing leg projecting from said planar surface of said head portion toward a tip of said hook-shaped leg and resiliently deformable about a base end thereof, wherein a projection projects from an inner surface of said hook-shaped leg near a base end thereof toward said unhooking-preventing leg; and wherein a tip of said projection is engageable with an inner surface of said unhooking-preventing leg within an elastic-limit range of said unhooking-preventing leg when said unhooking-preventing leg is deformed.

3. A swivel hook including:

a head portion having a planar surface;

a hook-shaped leg projecting from said planar surface of said head portion; and an unhooking-preventing leg projecting from said planar surface of said head portion toward a tip of said hook-shaped leg and resiliently deformable about a base end thereof, wherein a projection projects from an inner surface of said unhooking-preventing leg near a base end thereof toward said hook-shaped leg; and wherein a tip of said projection is engageable with an inner surface of said hook-shaped leg while said unhooking-preventing leg is within an elastic-limit range when said unhooking-preventing leg is deformed.

4. A swivel hook including:

a head portion having a planar surface;

a hook-shaped leg projecting from said planar surface of said head portion; and an unhooking-preventing leg projecting from said planar surface of said head portion toward a tip of said hook-shaped leg and resiliently deformable about a base end thereof, wherein a first and a second projections project from respective inner surfaces of said hook-shaped leg and said unhooking-preventing leg near respective base ends thereof toward each other, and wherein a total height of said projections is set to be such that said unhooking-preventing leg contacts an inner surface of said hook-shaped leg while said unhooking-preventing leg is within an elastic-limit range when said unhooking-preventing leg is deformed.

* * * * *